United States Patent [19]

Stoneham et al.

[11] 3,968,507
[45] July 6, 1976

[54] FILM ADVANCE-FLASH INTERLOCK MECHANISM

[75] Inventors: Jeffrey R. Stoneham, Hilton; Thomas E. Dussinger, Churchville, both of N.Y.

[73] Assignee: Eastman Kodak Company, Rochester, N.Y.

[22] Filed: Nov. 29, 1974

[21] Appl. No.: 528,305

[52] U.S. Cl. .............................................. 354/135
[51] Int. Cl.² ........................................ G03B 15/04
[58] Field of Search ........... 354/135, 126, 142, 149; 240/1.3

[56] References Cited
UNITED STATES PATENTS 3,677,153   7/1972   Bok ................................. 354/135
3,735,679   5/1973   Winkler ......................... 354/135 X

*Primary Examiner*—Joseph W. Hartary
*Attorney, Agent, or Firm*—T. H. Close

[57] ABSTRACT

A mechanism in which a latch is movable between a latching and an unlatching position. The latch includes a first arm engageable by a shutter actuator to move the latch to its unlatching position, a second arm for retaining a piezoelectric firing spring in a latched position when the latch is in its latching position and a third arm movable into engagement with a film advance mechanism to prevent short stroke operation during movement of the piezoelectric firing spring to its latched position.

4 Claims, 6 Drawing Figures

FILM ADVANCE-FLASH INTERLOCK MECHANISM

CROSS REFERENCE TO RELATED APPLICATIONS

Reference is made to commonly assigned, co-pending U.S. Pat. Application Ser. No. 528,529, filed Nov. 29, 1974 in the names of Jerry L. Hargrave and Harold L. Malone, and entitled CAMERA FLASH SOCKET and to commonly assigned, co-pending U.S. Pat. Application Ser. No. 528,528, filed Nov. 28, 1975, in the name of Robert F. O'Brien and entitled PIEZO CRYSTAL HOUSING AND MOUNT.

BACKGROUND OF THE INVENTION

1. Field of the Invention

The present invention relates to photographic apparatus and, more particularly, to an improved mechanism for insuring movement of a piezoelectric firing sprng to an energized position in such apparatus.

2. Description of the Prior Art

It is known in the photographic arts to provide for the ignition of a flashlamp by means of an electric pulse generated by a piezoelectric crystal and to provide for the synchronization of such flash ignition with shutter operation of a camera. See U.S. Pat. Nos. 2,856,564; 2,972,937 and 3,106,080. More recently, apparatus has been developed in which a plurality of flashlamps, fireable by electric energy generated by a piezoelectric crystal, are assembled into a multilamp array. In one such array, as is disclosed more fully in the referenced, co-pending application Ser. No. 528,529, entitled CAMERA FLASH SOCKET, all of the lamps are alligned in the same direction and each lamp has its own reflector, with a switching mechanism internal to the array for firing a particular lamp. As the piezoelectric crystal is to be struck repeatedly, it becomes necessary and desirable to provide mechanisms for striking the crystal within the camera so that a multitude of electric pulses of substantially the same magnitude and duration may be produced.

SUMMARY OF THE INVENTION

Accordingly, it is an object of the present invention to provide an improved mechanism for moving a piezoelectric firing spring to a latched position during operation of the camera;

It is a further object of the present invention to provide such an improved mechanism that moves the piezoelectric firing spring in response to operation of the film advance mechanism;

It is a further object of the present invention to provide such an improved mechanism which, while moving the piezoelectric firing spring during operation of the film advance mechanism, prevents short stroke operation of the film advance mechanism prior to latching of the piezoelectric firing spring;

It is a further object of the present invention to provide such a mechanism in which the latch for the piezoelectric firing spring prevents return of a film advance slide prior to movement of the piezoelectric firing spring to its latched position.

These and other objects of the present invention are provided by photographic apparatus including a shutter actuator, a piezoelectric firing spring, a latch and a film advance mechanism. The film advance mechanism includes a film advance slide that is movable from a rest position for advancing film. Movement of the film advance slide effects movement of the piezoelectric firing spring to its latched position and may also move the shutter actuator lever to an energized position. A latch is provided having a first arm engageable by the shutter actuator to move the latch to its unlatching position, a second arm engageable with the piezoelectric firing spring to retain the piezoelectric firing spring in its latched position and a third arm engageable with the film advance slide to prevent return of the film advance slide to its rest position prior to movement of the piezoelectric firing spring to its latched position.

DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
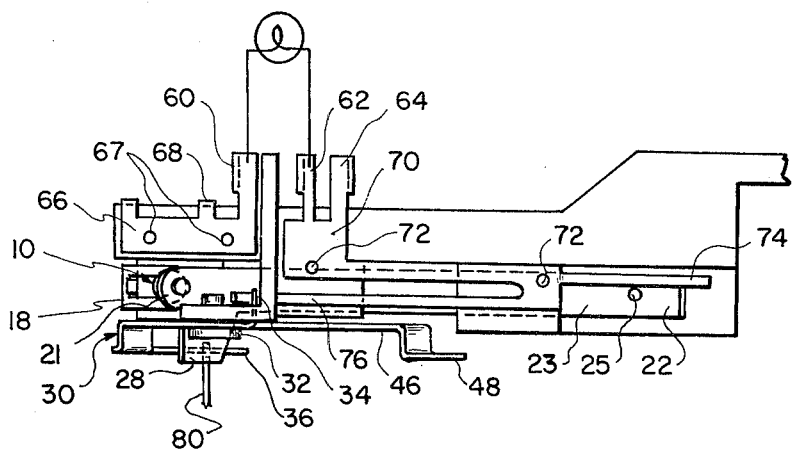
FIG. 1 is a front view of a portion of a camera incorporating the mechanism of the present invention.

Because photographic apparatus is well known, the present description will be directed in particular to elements forming part of, or cooperating more directly with, the present invention. Elements not specifically shown or described herein are understood to be selectable from those known in the art.

Referring now to the drawings, a photographic camera is illustrated, in part, which includes a piezoelectric generator 10, a piezoelectric firing spring 20, a latch 30, a film advance mechanism 50 and a shutter actuator 80. Piezoelectric generator 10 includes a piezoelectric crystal 12, first anvil 14 and second anvil 15. Piezoelectric generator 10 is formed by inserting second anvil 15, piezoelectric crystal 12 and first anvil 14 into a recess 16 within the camera. Piezoelectric generator 10 is retained within the camera by means of a spring clip 18 that engages a portion of first anvil 14 along with a pair of retaining lugs 19 that are fixed within the camera. Alternatively, piezoelectric generator 10 could be pre-assembled into a unitary package for insertion into recess 16 within the camera, such as is described more fully in referenced, U.S. application Ser. No. 528,528, entitled PIEZO CRYSTAL HOUSING AND MOUNT.

Piezoelectric firing spring 20 is an elongated leaf spring having opposed ends 21 and 22 and opposite surfaces 23 and 24. Piezoelectric firing spring 20 is movably mounted within the camera by means of a pin 25, which is fixed within the camera and which is received in an opening in end 22, and by a knife edge 27, which bears against surface 23 of piezoelectric firing spring 20 between ends 21 and 22 to provide a fulcrum. A hammer 26 is mounted on surface 24 of piezoelectric firing spring 20 near end 21, which also includes a latching lug 28 adjacent hammer 26.

Latch 30 is movably mounted on a pin 32, fixed within the camera, and includes a spring lug 34, a first arm 36 having a first cam surface 38, a second arm 40 having a second cam surface 42 and a latch surface 44, and a third arm 46 terminating in a pawl 48.

Mounted within the camera is a film advance mechanism 50, which includes a film advance slide 52 having a rack gear 54. Film advance mechanism 50 is biased to the left to a rest position by a spring 56. Rack gear 54 is designed to engage with and drive the film advance gear train of the camera during operation of film advance mechanism 50 by the photographer. Many such film advance gear trains are known in the art, such as is shown in U.S. Pat. No. 3,736,854, and any of these may be utilized with the film advance-flash interlock mechanism of the present invention.

Figure 2:
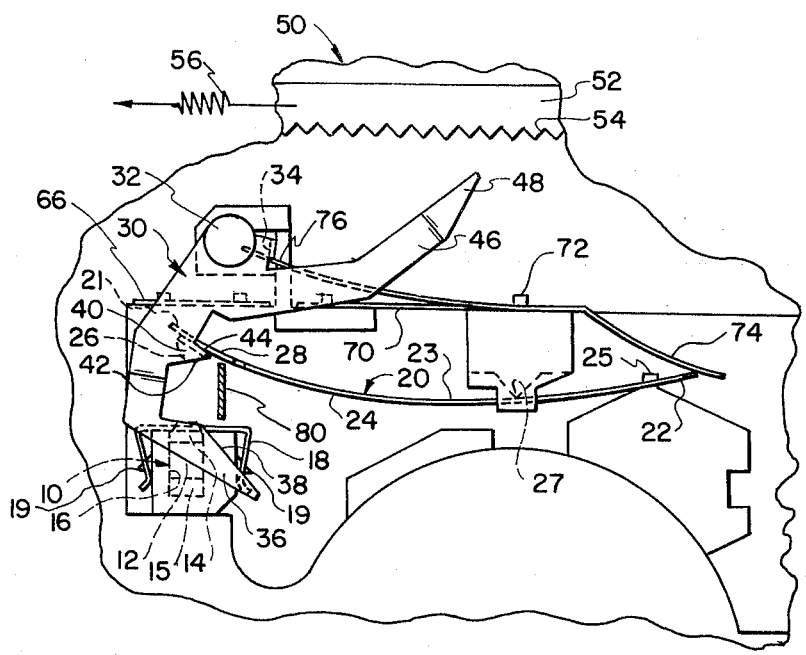
FIG. 2 is a top view of the mechanism illustrated in FIG. 1 with the piezoelectric firing spring in its latched position.
Figure 4:
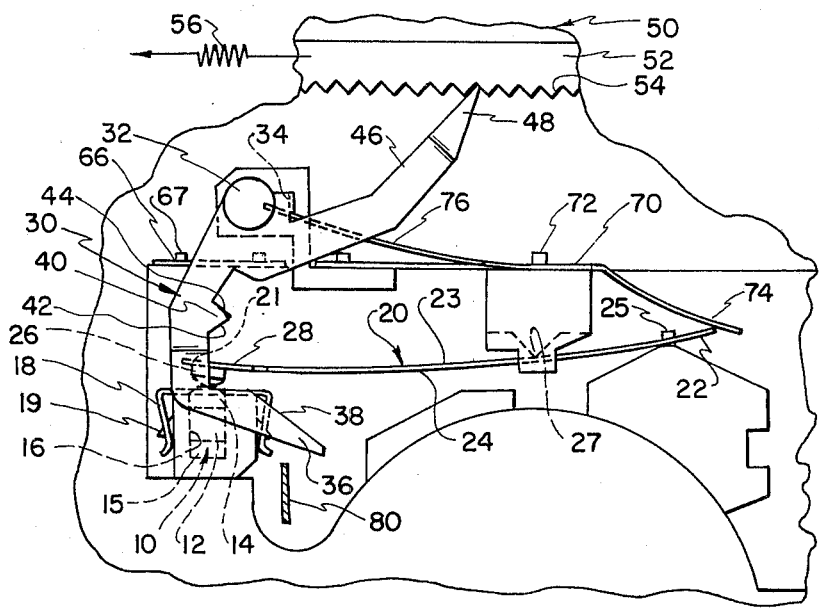
FIG. 4 is a top view of the mechanism with the piezoelectric firing spring in its striking position.
Figure 5:
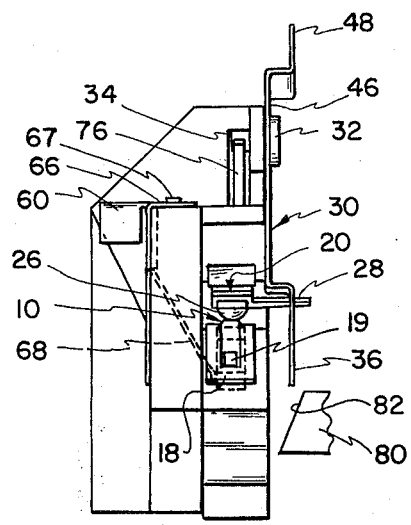
FIG. 5 is a side view of the mechanism as illustrated in FIG. 4.

FIG. 1 also illustrates the electrical connection of piezoelectric generator 10 to a flash unit which, while not essential to the operation of the film advance-flash interlock mechanism of the present invention, may be used with that mechanism. In the flash socket of the camera, as is more fully disclosed in the referenced co-pending U.S. patent application Ser. No. 528,529, entitled CAMERA FLASH SOCKET, three contacts are provided, 60, 62 and 64. Contact 60 is integrally formed with a contact strip 66, fixedly mounted within the camera by pins 67, and with a resilient portion 68 that is biased into contact with a portion of second anvil 15 (FIG. 5). Contacts 62 and 64 are joined to a common contact strip 70, fixedly mounted within the camera by means of pins 72, that includes a contact end 74 and a spring end 76. As best seen in FIGS. 2 and 4, contact end 74 is urged into engagement with end 22 of piezoelectric firing spring 20 by means of their resiliency. In a preferred embodiment, piezoelectric firing spring 20 and hammer 26 are formed of electrically conducting materials so that electrical connection is established between first anvil 14 and contacts 62 and 64 through hammer 26, piezoelectric firing spring 20, end 22 and contact end 74 to contact strip 70. Concurrently, electrical connection is established between second anvil 15 and contact 60 through resilient portion 68 and contact strip 66. Thus, when hammer 26 strikes first anvil 14, an electrical circuit is completed for directing an electric pulse from piezoelectric generator 10 to contacts 60 and 62 in the camera socket. Spring end 76 engages spring lug 34 and biases latch 30 in a counterclockwise direction about pin 32.

Figure 3:
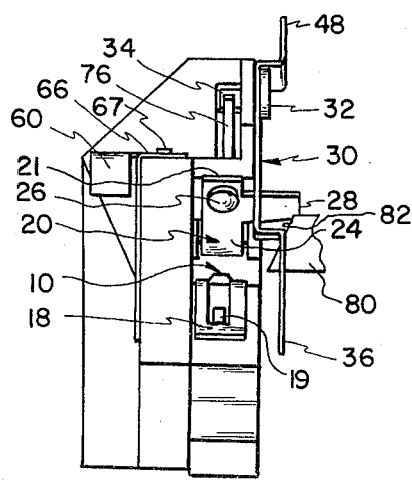
FIG. 3 is a side view of the mechanism as illustrated in FIGS. 1 and 2.
Figure 6:
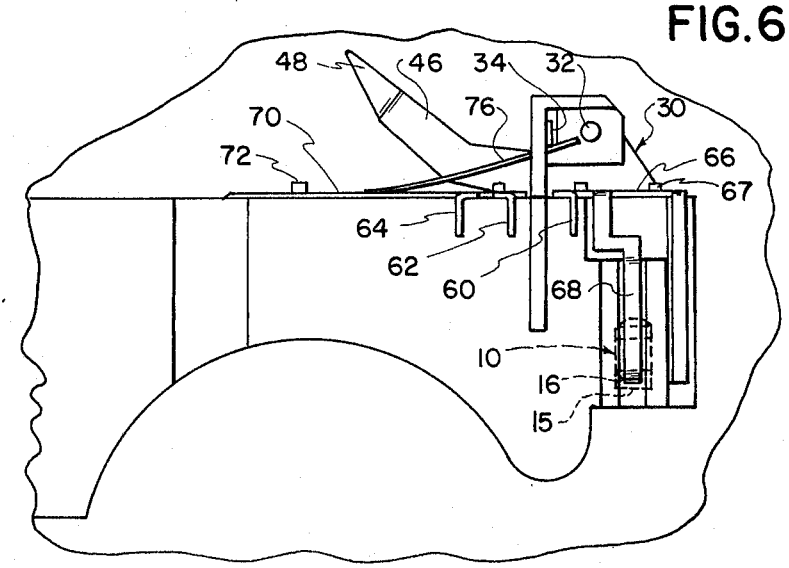
FIG. 6 is a rear view of the mechanism as illustrated in FIGS. 4 and 5.

The flash actuating mechanism, as illustrated in FIGS. 1–3, is in its latched position. Latch surface 44 engages latching lug 28 and retains piezoelectric firing spring 20 in its latched position in which piezoelectric firing spring 20 is flexed across knife-edge 27. Simultaneously, spring end 76 biases latch 30 in a counterclockwise direction to retain piezoelectric firing spring 20 in its latched position. It should be noted that piezoelectric firing spring 20 may be flexed in both its latched position (FIGS. 1–3) and its striking position (FIGS. 4–6) so that it may be held within the camera by pin 25 and knife-edge 27.

When the operator desires to take a flash illuminated picture, a multilamp flash array or electronic flash unit is inserted in the camera socket. During subsequent exposure operation of the camera, a shutter actuator or high energy lever is released to move to actuate the shutter. Many such mechanisms are known in the art, such as the high energy lever described in U.S. Pat. No. 3,736,854, and the disclosure of that U.S. Patent is hereby incorporated by reference. A portion of the shutter actuator, or high energy lever, shown generally as 80, will be moved in a downward direction into contact with the first cam surface 38 on first arm 36 of latch 30. Continued downward movement of shutter actuator 80 will cause clockwise rotation of latch 30 about pin 32 against the bias of spring end 76 until latch surface 44 is disengaged from latching lug 28 on piezoelectric firing spring 20. Piezoelectric firing spring 20 is now free to move to its striking position (FIG. 4) in which hammer 26 strikes first anvil 14, thereby causing generation of electrical energy by piezoelectric crystal 12. As has been described before, the electric pulse will be transmitted through hammer 26 and piezoelectric firing spring 20 to contact strip 70 and through resilient portion 68 to contact strip 66. The electrical pulse will thus be presented across contacts 60 and 62 to fire the flash lamp or electronic flash unit. In the event that no flash unit is present in the camera socket, the pulse will still be presented across contacts 60 and 62 but will not be utilized. After release of piezoelectric firing spring 20, latch 30 moves to its unlatched position as best seen in FIG. 4, under the bias of spring end 76 against spring lug 34. Hammer 26 has struck first anvil 14. Pawl 48 on third arm 46 is in engagement with rack gear 54 on film advance slide 52. For subsequent operation of the camera, the operator will actuate film advance mechanism 50 so as to move film slide 52 and rack gear 54 to the right against the bias of spring 56. Such movement is permissible since rack gear 54 will merely move pawl 48 against the bias of spring end 76 on spring lug 34. However, return movement of film advance slide 52 to the left is not possible, so long as pawl 48 engages rack gear 54. Operation of film advance mechanism 50 moves shutter actuator 80 upwardly using any well known coupling mechanism, such as that of U.S. Pat. No. 3,736,854. Initial upward movement of shutter actuator 80 brings cam surface 82 into engagement with first arm 36 which flexes to permit shutter actuator 80 to pass. Further movement brings shutter actuator 80 into engagement with latching lug 28 on piezoelectric firing spring 20 and will cause upward movement of piezoelectric firing spring 20. Latching lug 28 will come into contact with second cam surface 42 on second arm 40, thereby causing latch 30 to be rotated in a clockwise direction against the bias of spring end 76 against spring lug 34. Continued upward movement of shutter actuator 80 and continued clockwise rotation of latch 30 will move latching lug 28 past the end of second cam surface 42. When this occurs, spring end 76 urges latch 30 in a counterclockwise direction to cause engagement of latch surface 44 with latching lug 28. Movement of latch 30 in a clockwise direction by engagement of latching lug 28 and second cam surface 42 will also remove pawl 48 from engagement with rack gear 54 on film advance slide 52. Thus the engagement of pawl 48 with rack gear 54 prevents short stroke operation of film advance slide 52 prior to movement of piezoelectric firing spring 20 to its latched position in which pawl 48 is disengaged from rack gear 54. Film advance slide 52 may now return to the left to its rest position under the bias of spring 56 and the film advance-flash interlock mechanism will once again be in the position illustrated in FIGS. 1–3, ready for subsequent picture taking operation of the camera.

The invention has been described in detail with particular reference to a preferred embodiment thereof, but it will be understood that variations and modifications can be effected within the spirit and scope of the invention.

We claim:

1. A photographic camera comprising:
   means, including a first member movable from a rest position, for advancing film within said camera;
   means, including a piezoelectric crystal, for generating electrical energy;
   a second member movable from a latched position to strike said generating means and generate electrical energy;
   means for releasably retaining said second member in said latched position;
   means, coupling said first and second movable members, for moving said second member to its latched position in response to movement of said first member from its rest position; and
   means, including a blocking member, for preventing return of said first member to its rest position prior to movement of said second member to its latched position.

2. A photographic camera comprising:
   means, including a first member movable from a rest position to a film advancing position, for advancing film within said camera;
   means, including a piezoelectric crystal, for generating electrical energy;
   a second member movable from a latched position into engagement with said generating means to produce electrical energy;
   means, including a blocking member, for releasably retaining said second member in said latched position;
   means for releasing said second member for movement from said latched position;
   means, coupling said first and second movable members, for moving said second member to said latched position in response to movement of said first member from said rest position toward said film advancing position; and
   means, coupling said retaining means and said film advancing means, for preventing return of said first member to said rest position prior to movement of said second member to said latched position.

3. A photographic camera comprising:
   means, including a slide movable from a rest position to a film advancing position, for advancing film within the camera;
   means, including a piezoelectric crystal, for generating electrical energy;
   a firing spring including a hammer mounted thereon, said firing spring being movable from a latched position to bring said hammer into engagement with said generating means and generate electrical energy;
   means, including a movable member, for moving said firing spring to said latched position in response to movement of said slide from its rest position toward its film advancing position; and
   a latch movable from a latching positon to an unlatching position and comprising first, second and third arms, said first arm being engageable by said movable member for moving said latch to its unlatching position, said second arm being engageable with said firing spring to retain said firing spring in its latched position until said latch is moved to said unlatching position, and said third arm being engageable with said slide to prevent return of said slide to its rest position until said firing spring has been moved to its latched position.

4. A photographic camera comprising:
   a slide movable from a rest position;
   means coupled to said slide for advancing film within the camera;
   means, including a piezoelectric crystal, for generating electrical energy;
   a firing spring having a hammer mounted thereon, said firing spring being movable from a latched position to bring said hammer into engagement with said generating means and generate electrical energy;
   a member movable to engage and move said firing spring to its latched position and further movable to an unlatching position;
   means, coupling said slide and said movable member, for moving said member to engage and move said firing spring to said latched position in response to movement of said slide from its rest position;
   means for moving said movable member to its unlatching position; and
   a latch movable between a latching and an unlatching position and comprising first, second and third arms, said first arm being engageable by said movable member for moving said latch to its unlatching position during movement of said movable member to its unlatching position, said second arm being engageable with said firing spring to retain said firing spring in its latched position until said latch is moved to its unlatching position, and said third arm being engageable with said slide to prevent return of said slide to its rest position until said firing spring has been moved to its latched position.

* * * * *